Patented Jan. 4, 1944

2,338,114

UNITED STATES PATENT OFFICE 2,338,114

PROCESS FOR THE PREPARATION OF POLY-HYDROXYDIBASIC ACIDS AND THEIR SALTS

Horace S. Isbell, Washington, D. C., assignor to Government of the United States, represented by the Secretary of Commerce No Drawing. Application July 7, 1942, Serial No. 450,066

11 Claims. (Cl. 260—535)

(Granted under the act of March 3, 1883, as amended April 30, 1928; 370 O. G. 757)

The invention described herein may be manufactured and used by or for the Government for governmental purposes without the payment to me of any royalty thereon.

The present invention relates to a process of preparing polyhydroxydibasic acids and their salts.

It is an object of the present invention to provide an improved process for the conversion of uronic acids or their salts to salts of dibasic acids, and the recovery of the acids from the reaction mixture. Other objects of the invention will appear more fully from the following specification.

Uronic acids occur in large quantities in many natural products, as, for example, in the pectins, gums, and various polysaccharides. These abundant raw materials provide cheap starting substances for the preparation of dibasic salts and their acids by the present invention.

In accordance with the present invention, the conversion of the uronic acids or their salts to salts of polyhydroxydicarboxylic acids containing one carbon less than the parent acid, is effected by the treatment thereof with oxygen while in alkaline solution.

The practice of the present invention is illustrated by the following examples in which ordinary laboratory equipment may be used.

Example 1

Approximately 100 grams of a uronic acid, such as galacturonic acid, is dissolved in 2.5 liters of normal potassium hydroxide solution which preferably has been previously saturated with oxygen. Oxygen is then introduced into the solution which is agitated by means of a conventional stirrer, and the solution is maintained at, say, 25° C. The temperature can be varied over a wide range but best results are obtained at temperatures between 0° and 50° C.

When the absorption of oxygen is substantially complete, the solution is evaporated in vacuo to about 200 ml. The sirup is then mixed with 2 liters of ethyl alcohol. The clear alcoholic solution, which contains the excess potassium hydroxide, is decanted from the sirupy residue which contains potassium trihydroxyglutarate.

The sirupy residue is seeded with potassium d-arabo-trihydroxyglutarate and the crystals which form on standing are separated by filtration. The potassium d-arabo-trihydroxyglutarate may be used as such or it may be converted to d-arabo-trihydroxyglutaric acid in the usual manner.

Should glucuronic acid be used as a starting material instead of galacturonic acid, the same procedure is followed, and the resulting product is the same, namely, potassium d-arabo-trihydroxyglutarate.

Example 2

A 10% solution of crude potassium galacturonate may first be prepared, say, by neutralizing the liquor from pectic acid after hydrolysis with pectinase (Rohm and Haas Pectinol-100). The solution of potassium galacturonate is cooled to approximately 0° C. It is then saturated with oxygen and sufficient potassium hydroxide is added to give 1 mole per liter. The solution is shaken with oxygen until it is no longer absorbed.

The resulting salt of trihydroxyglutaric acid is then converted to an insoluble basic calcium salt by the addition of calcium chloride. The basic calcium salt may be collected on a filter and washed with water. It may be then converted to trihydroxyglutaric acid by the addition of sufficient sulphuric acid to remove the calcium as calcium sulphate.

Example 3

When using the sodium calcium galacturonate described in my copending application Serial No. 450,065, filed July 7, 1942, the procedure is conveniently as follows: approximately 100 grams of sodium calcium galacturonate is suspended in one liter of normal sodium hydroxide solution containing 15 grams of sodium carbonate. Oxygen is introduced into the mixture which is maintained in a state of agitation at a convenient temperature, say, 25° C. When the absorption of oxygen ceases, the operation is interrupted, and the mixture which contains trihydroxyglutarate is filtered.

The sodium trihydroxyglutarate may be crystallized from the filtered solution, or it may be converted to the insoluble basic calcium salt by the adddition of calcium chloride as set forth in Example 2.

In the event that free trihydroxyglutaric acid is desired, it may be separated from the filtered solution which contains sodium trihydroxyglutarate by acidification with a mineral acid, such as sulphuric acid. The solution is then evaporated to remove the volatile acids, and the residue extracted with alcohol. The free trihydroxyglutaric acid crystallizes from the alcoholic solution.

In each of the foregoing examples, upon the mixing of the uronic acid or its salt and the alkali, oxygen is preferably supplied in excess of the requirements of the reaction and maintained in intimate contact with the reaction mixture. This may be accomplished conveniently by vigorous stirring of the mixture while supplying the oxygen under pressure. When air is used as the source of oxygen, it is preferable to conduct the oxidation reaction under a pressure of, say, two or three atmospheres.

The invention may be variously modified and embodied within the scope of the subjoined claims.

I claim:

1. A step in the process of forming polyhydroxydicarboxylic acid, which comprises the oxidation of a uronic acid in alkaline solution with oxygen.

2. The process which comprises the oxidation of a uronic acid in alkaline solution with air, said mixture being under pressure during said oxidation, and the separation of the salt of trihydroxyglutaric acid.

3. The process which comprises the oxidation of galacturonic acid in alkaline solution with oxygen, and the separation of d-arabo-trihydroxyglutarate.

4. The process which comprises the oxidation of an alkaline metal galaturonate with oxygen and the separation of the resulting alkaline metal trihydroxyglutarate.

5. The process which comprises subjecting to oxygen an alkaline solution of a galacturonate, and separating the resulting trihydroxyglutarate.

6. The process which comprises the oxidation of potassium galacturonate with oxygen, and separating the resulting potassium tridydroxyglutarate.

7. The process which comprises the oxidation of an alkaline metal galacturonate with oxygen and separating the resulting trihydroxyglutarate.

8. The process which comprises the mixing of sodium calcium galacturonate with aqueous sodium hydroxide containing sodium carbonate, then treating with oxygen, and separating the resulting trihydroxyglutarate.

9. The process of forming trihydroxyglutaric acid, which comprises the oxidation of sodium calcium galacturonate in alkaline solution with oxygen, acidification of the reaction mixture and separating the resulting trihydroxyglutaric acid.

10. The process which comprises the oxidation of sodium galacturonate with oxygen in the presence of approximately normal alkali and the separation of the resulting sodium trihydroxyglutarate.

11. The process of forming trihydroxyglutaric acid which comprises the oxidation of sodium calcium galacturonate in alkaline solution with oxygen, separating the resulting trihydroxyglutarate in the form of a calcium salt, and converting said calcium salt to trihydroxyglutaric acid by acidification.

HORACE S. ISBELL.